United States Patent
Makhlouf et al.

(10) Patent No.: US 8,712,331 B2
(45) Date of Patent: Apr. 29, 2014

(54) METHODS AND APPARATUS FOR MITIGATING INTERFERENCE BETWEEN CO-LOCATED COLLABORATING RADIOS

(75) Inventors: Isam R. Makhlouf, Lake Zurich, IL (US); Michael H. Baker, Elmhurst, IL (US); Xiaowei Jin, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 193 days.

(21) Appl. No.: 13/446,087

(22) Filed: Apr. 13, 2012

(65) Prior Publication Data

US 2013/0272436 A1  Oct. 17, 2013

(51) Int. Cl.
    *H04B 15/00* (2006.01)
(52) U.S. Cl.
    USPC .......... 455/63.1; 455/67.13; 370/329
(58) Field of Classification Search
    USPC .......... 455/450, 452.1, 452.2, 500, 501, 509, 455/517, 63.1, 67.11, 67.13; 370/252, 328, 370/329
    See application file for complete search history.

(56) References Cited

U.S. PATENT DOCUMENTS

| | | | |
|---|---|---|---|
| 7,640,373 B2 | 12/2009 | Cudak et al. | |
| 7,653,397 B2 | 1/2010 | Pernu et al. | |
| 7,693,486 B2 | 4/2010 | Kasslin et al. | |
| 7,860,521 B2 | 12/2010 | Chen et al. | |
| 8,094,737 B2 | 1/2012 | Nguyen | |
| 2009/0262690 A1 | 10/2009 | Breuer et al. | |
| 2010/0035627 A1 | 2/2010 | Hou et al. | |
| 2010/0056153 A1 | 3/2010 | Attar et al. | |
| 2010/0189093 A1 | 7/2010 | Palanki et al. | |
| 2011/0250919 A1* | 10/2011 | Barbieri et al. | 455/509 |
| 2013/0115985 A1* | 5/2013 | Davydov et al. | 455/501 |
| 2013/0258869 A1* | 10/2013 | Zhou et al. | 370/252 |
| 2013/0315188 A1* | 11/2013 | Pajukoski et al. | 370/329 |

FOREIGN PATENT DOCUMENTS

EP  1763191 A2  3/2007

OTHER PUBLICATIONS

PCT International Search Report Dated Jul. 5, 2013 for Counterpart Application PCT/US2013/035712.
3GPP 36.213 LTE Standard; RAN E-UTRA Physical Layer Procedures; Section 7.2; Sep. 2010; 17 Pages.

* cited by examiner

*Primary Examiner* — Thanh Le
(74) *Attorney, Agent, or Firm* — Kenneth A. Haas

(57) ABSTRACT

A method and apparatus for mitigating out of band emissions among user equipment and base stations operating at geographically co-located and spectrally distinct wireless communication systems are provided herein. During operation, a wireless radio will determine potential interferers. Preferably, these interferers comprise user equipment and base stations operating at geographically co-located and spectrally distinct wireless communication systems. Once determined, a channel quality indicator (CQI) will be adjusted accordingly to accommodate for any potential interferer. Because the CQI will take into effect any potential interferer, transmissions to/from the wireless radio will be made more robust, decreasing channel interference.

20 Claims, 5 Drawing Sheets

METHODS AND APPARATUS FOR MITIGATING INTERFERENCE BETWEEN CO-LOCATED COLLABORATING RADIOS

FIELD OF THE DISCLOSURE

The present disclosure relates generally to wireless communication base stations and mobile devices, and more particularly to a method and apparatus for mitigating interference between geographically co-located and spectrally distinct wireless transceivers.

BACKGROUND

Hurricanes, tornadoes, floods, and other natural disasters, as well as other life-threatening emergencies, underscore the need for a robust communications infrastructure for use by local, state, and federal emergency response teams. Police departments, fire departments, "911" call centers and other law enforcement personnel increasingly rely upon mobile wireless communication devices (also referred to herein as "user equipment" or "UE", or radios), typically dash-mounted or hand-held, to coordinate first response and "on scene" rescue efforts with citizens, dispatchers, and fellow public safety organizations.

The proliferation of cellular telephones and other broadband communication devices oftentimes interfere with radios allocated for public safety applications. For example, digital data transmissions over wired and wireless channels sometimes may be corrupted, for instance, by noise in the link or channel, caused by interference from other transmissions. In order to solve this problem, many communication systems employ error-correction techniques to aid in communication. However, even with error-correction techniques, it may often be impossible to adequately mitigate interference between geographically co-located and spectrally distinct wireless transceivers. Therefore a need exists for a method and apparatus for methods and apparatus for mitigating interference between geographically co-located and spectrally distinct (e.g., operating on different frequencies) wireless transceivers.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
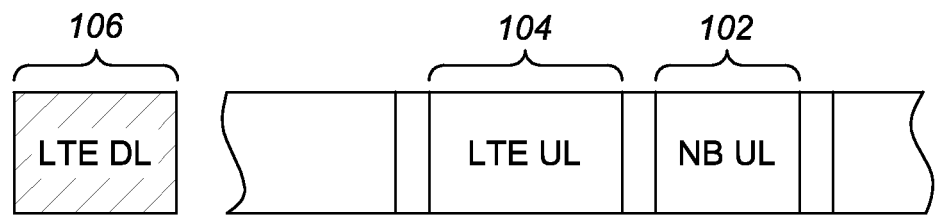
FIG. 1 illustrates a portion of the electromagnetic spectrum including bandwidths allocated to public safety applications in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In order to address the above-mentioned need, a method and apparatus for mitigating interference between geographically co-located and spectrally distinct wireless transceivers are provided herein. During operation, a wireless radio will determine potential interferers and their scheduling and transmission frequency characteristics. Preferably, these interferers comprise geographically co-located and spectrally distinct wireless transceivers. The wireless transceivers may be co-located user equipment or may reside within the same device. Once potential interferers are determined, a channel quality indicator (CQI) report, comprised of sub-band or wideband components, will be adjusted accordingly to accommodate for any potential interference impacting some or all of the wireless radio's receive band. Because the CQI report will take into effect the identified potential interference, transmissions to the wireless radio will be received more reliably.

The Federal Communications Commission (FCC) is responsible for allocating the finite radio frequency spectrum among various government entities, cellular telephone and data carriers, and a host of competing corporate and individual interests. In that capacity, the FCC has allocated certain frequency bands for use by and for the benefit of local, state, and national public safety organizations and applications.

In particular, the frequency band including 799 to 805 megahertz (MHz), 806 to 809 MHz, 809 to 815 MHz, and 817 to 824 MHz, paired with 769 to 775 MHz, 851 to 854 MHz, 854 to 860 MHz, and 862 to 869 MHz have been allocated for public safety (PS) narrowband (NB) voice communications by police, fire, and other emergency response teams. These frequencies support "push-to-talk" land mobile radio (LMR) two-way radio devices used by law enforcement agencies across the country.

The FCC has also designated the frequency band from 788 to 798 MHz and paired with 758 to 768 MHz for broadband public safety transmissions. The FCC has mandated the use of 3GPP Long Term Evolution technology (referred to herein as LTE) in this broadband spectrum. This corresponds to the 3GPP evolved universal mobile telecommunications system terrestrial radio access (E-UTRA) operating band 14 of the frequency spectrum.

The FCC has also designated the frequency band from 787 to 788 MHz and paired with 746 to 756 MHz (referred to as operating band 13 and also expected to be LTE compliant) for broadband operations, and public operators are the primary operators within this range.

In addition to the aforementioned public safety LMR bands, other FCC designated bands, such as the Cellular A&B band which is designated from 824 to 849 MHz and paired with 869 to 894 MHz, may also be used within or in the vicinity of public safety devices.

Because the foregoing public safety and commercial operator LTE spectrum allocations are spectrally near the legacy narrow band voice band and Cellular A&B band, some of the energy from an LTE device may mix with transmissions from a legacy narrow band or Cellular A&B band transceiver, resulting in the formation of addition signal components at additional frequencies that fall within the receive band of the LTE device. This phenomenon is known as intermodulation distortion (IMD). Under certain conditions, the IMD may cause undesirable radio interference to communications between an LTE base station and the LTE device, particularly when the other transceiver is geographically co-located with (e.g., in the same police car or fire truck), or located within the interfering LTE device. Those skilled in the art will appreciate that radio frequency tuning equipment, such as band pass filters, can selectively attenuate a desired frequency range to mitigate the IMD; however, they are not always feasible or practical due to cost and design constraints.

FIG. 1 is a segment 100 from the radio frequency (RF) portion of the electromagnetic spectrum illustrating the uplink (UL) and downlink (DL) of two exemplary frequency division duplex (FDD) bands that are adjacent to or nearby each other, and that are spectrally distinct (i.e., operating at differing frequencies). More particularly, the UL of public safety (PS) narrow band (NB) band 102 may include frequencies ranging from 799 megahertz to 815 MHz. A nearby (or adjacent) UL band 104 may include frequencies ranging from 776 megahertz to 798 MHz, and is allocated to broadband, LTE compliant public safety communications and applications. In particular, band 104 may include, inter alia, one or more of the following bands: 776 to 787 MHz, 788 to 793 MHz, and 793 to 799 MHz. IMD between 102 and 104 can cause IMD that falls in the LTE DL band 106 that is paired with 104. In particular, band 16 may include 746 to 757 MHz, 758 to 763 MHz, and 763 to 768.

Figure 2:
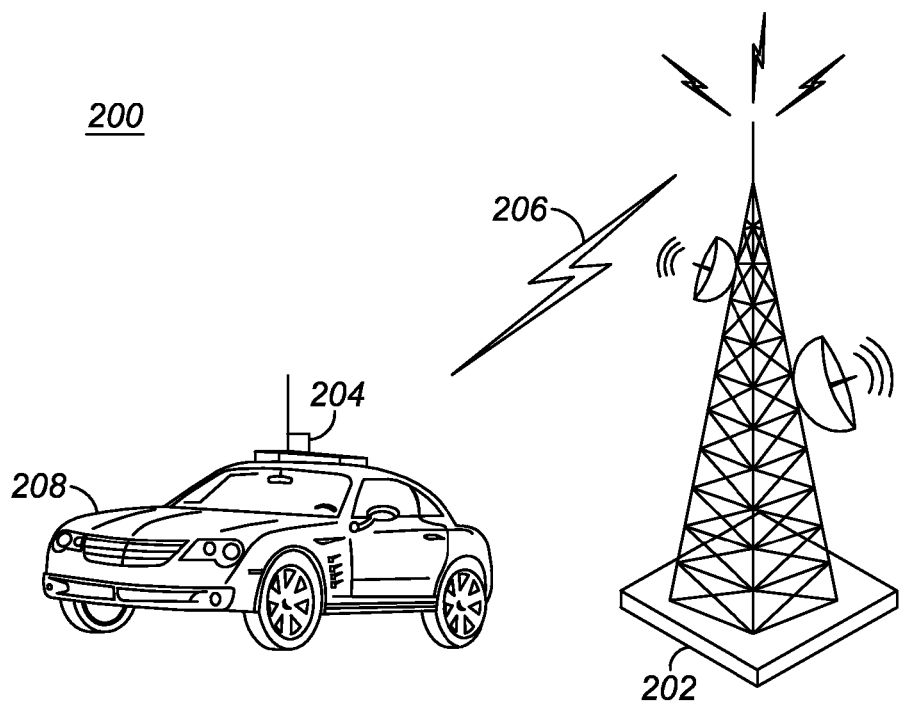
FIG. 2 illustrates an exemplary emergency response vehicle and associated base station in accordance with some embodiments.

FIG. 2 illustrates a portion of an exemplary legacy public safety voice band wireless network 200 including a base station 202 and a mobile station 204. It should be appreciated that the wireless networks described herein may contain any number of base stations and associated wireless mobile devices. In FIG. 2, mobile station 204 is illustrated as a box with a simple antenna mounted atop an emergency response vehicle 208, for example a police car. Mobile station 204 may also include a transmitter, receiver, processor, memory, user input and output hardware, and the like (not shown). Mobile station 204 may be dash-mounted, hand-held, or removably or permanently affixed to vehicle 208.

In operation, network 200 may employ any desired modulation scheme in any desired frequency range to transmit data packets 206 from base station 202 to mobile station 204 (known as the downlink or DL), and from mobile station 204 to base station 202 (known as the uplink or UL).

One or more of the various mobile wireless communication devices discussed herein, such as mobile station 204, may be, for example, a portable/mobile radio, a personal digital assistant, a cellular telephone, a video terminal, a portable/mobile computer with a wireless modem, or any other wireless communication device. For purposes of this description, such a mobile wireless communication device may also be referred to as a subscriber unit, a mobile station, mobile equipment, a handset, a mobile subscriber, a vehicular subscriber modem, user equipment (UE), or an equivalent used in accordance with any known standards or protocols. In addition, although not illustrated, such mobile devices may include a Global Positioning System (GPS) capability that allows it to determine GPS coordinates that specify its geographic location. As is well-known in the art, a GPS receiver receives signal information transmitted from a GPS transmitter, and a GPS processor in the mobile device uses this information along with triangulation processing techniques to calculate its geographic location, which can be specified as a latitude coordinate, a longitude coordinate and, optionally, an altitude coordinate.

It should also be noted that various wireless communication networks discussed herein can generally be any type of voice, data, and/or broadband radio access network, and that specific non-limiting examples are described herein, where one or more of the broadband radio access networks is a narrow band voice network or a LTE compliant network that operates in accordance with LTE standards.

As will be appreciated by those skilled in the art, "LTE" refers to an ongoing standards development effort within the 3rd Generation Partnership Project (3GPP), which develops specifications to define improvements to the Universal Mobile Telecommunications System (UMTS), which is described in a suite of Technical Specifications (TS) developed within and publicized by the 3GPP. As of this writing, the most recent version of the 3GPP TSs were published in June, 2011. Enhancements to the UMTS that are described in the LTE standards were first introduced beginning with 3GPP Release 8. 3GPP Release 8 describes an architecture referred to as the Evolved Packet System (EPS), which includes an Evolved UTRAN (E-UTRAN) on the radio access side and an Evolved Packet Core (EPC) on the core network side.

Other infrastructure devices that may be included in the networks described herein include switches, zone controllers, base station controllers, repeaters, access points, routers, and the like. For sake of brevity these and other details will not be further described herein.

Figure 3:
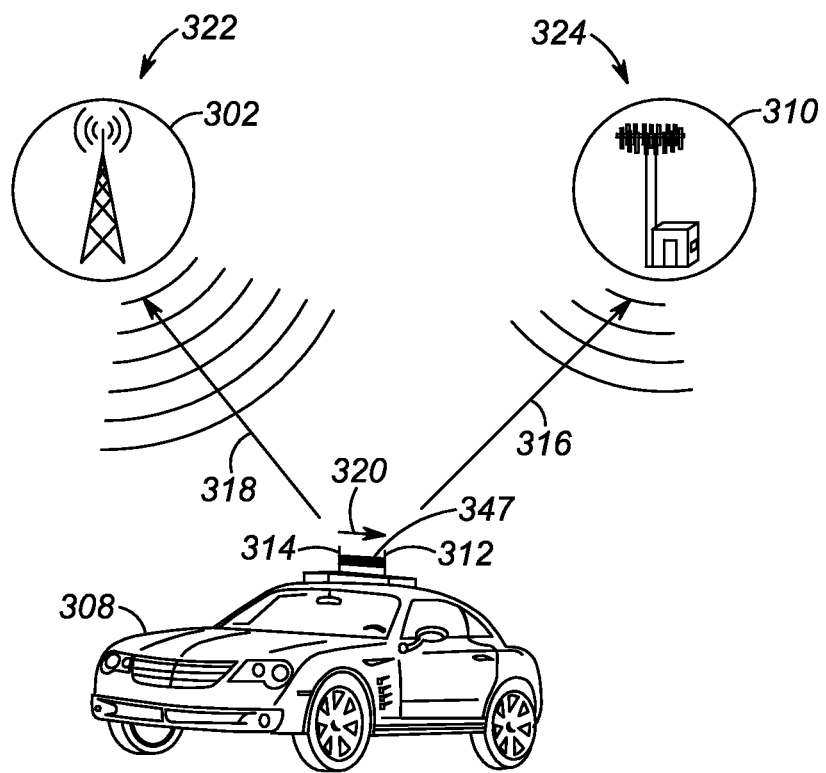
FIG. 3 illustrates spectrally adjacent wireless base stations and their associated wireless mobile devices co-located in a public safety vehicle in accordance with some embodiments.

Referring now to FIG. 3, a system 300 for mitigating interference between user equipment of geographically co-located and spectrally distinct wireless networks is shown. More particularly, a first network 322 (e.g., an LMR network) includes a base station 302 and one or more mobile stations (MS) 314. As shown, one such mobile station is located in a public safety vehicle 308. A second network 324 (e.g., an LTE network) includes a base station 310 and one or more mobile stations (user equipment (UE)) 312. In an embodiment, first mobile station 314 communicates with (e.g., is connected to) second mobile device (UE) 312 through a data link 347 that may be, for example, a dedicated wired or wireless data link such as a communication link compliant with a Bluetooth™ standard, universal serial bus (USB), or other suitable communications link. Preferably, this data link comprises via a short-range wireless communication. In this way, the two mobile devices may be regarded as collaborating radios. In an alternate embodiment, 314 and 312 may be transceivers (also referred to herein as "radios") located within the same device.

Although radios 312 and 314 are shown located on vehicle 308, in an alternate embodiment of the present invention radios 312 and 314 may be under the control of different individuals that happen to be co-located, and able to share a short-range (e.g., 40 feet or less) communication link such as a Bluetooth communication link.

First network 322 operates within a first frequency band (e.g., band 102, FIG. 1) and employs a first modulation scheme. Second network 324 operates within a second frequency band (e.g., band 104, FIG. 1) and employs a second modulation scheme. In accordance with LTE standards, second network 324 employs an orthogonal frequency division multiple access (OFDMA) modulation scheme for the DL and single carrier frequency division multiple access (SCFDMA) for the UL. In an embodiment, the first and second bands are spectrally adjacent or otherwise close to each other; that is, the two bands correspond to adjacent or nearby frequency bands in the RF spectrum. In one embodiment of the present invention, first network 322 may also operate utilizing an OFDMA modulation scheme. In an alternate embodiment of the present invention, first network 322 may also operate utilizing a CDMA modulation scheme.

With continued reference to FIG. 3, UE 312 and device 314 are geographically co-located, meaning that they are temporarily or permanently physically located at the same location, for example, in the same device, in the same vehicle, worn or carried by the same person or two persons in close proximity to each other (e.g., within 30 meters), or in two separate vehicles that are transiently proximate one another. In the embodiment illustrated in FIG. 3, they are co-located within vehicle 308.

In operation, a signal 316 is transmitted between UE 312 and base station 310 within network 324 and a signal 318 is transmitted between an interfering radio 314 and base station 322. When these transmissions occur simultaneously, the interfering signal 320 (shown as an arrow for clarity) can mix with signal 316 inside UE 312 and cause IMD that falls within the receive band of UE 312.

IMD caused by signal 320 may cause reduced receiver sensitivity in UE 312. In accordance with an embodiment, by establishing a communication path between mobile devices 312 and 314, the operational parameters associated with downlink transmission 322 may be adjusted to mitigate IMD caused by signal 320, as needed.

Figure 4:
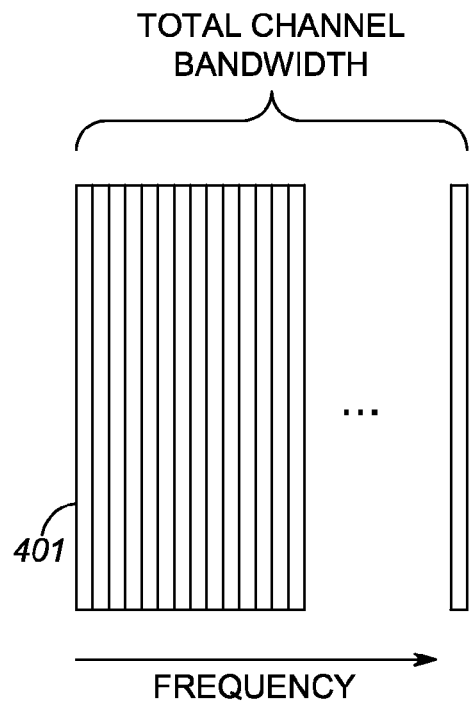
FIG. 4 and FIG. 5 illustrate channel allocation and channel quality over a wideband frequency range.

During operation of an OFDM or OFDMA system (e.g., network 324), multiple subcarriers (e.g., 300 subcarriers) are utilized to transmit data to and from radio 312. This is illustrated in FIG. 4. As shown in FIG. 4 the wideband channel is divided into many narrow frequency bands (subcarriers) 401, with data being transmitted in parallel on subcarriers 401. In addition to OFDM, communication system 324 utilizes Adaptive Modulation and Coding (AMC). With AMC, the modulation and coding format of a transmitted data stream for a particular receiver is changed to predominantly match a current received signal quality (at the receiver) for the particular frame being transmitted. The modulation and coding scheme (MCS) may change on a frame-by-frame basis in order to track the channel quality variations that occur in mobile communication systems. Thus, streams with high quality are typically assigned higher order modulations rates and/or higher channel coding rates with the modulation order and/or the code rate decreasing as quality decreases. For those receivers experiencing high quality, modulation schemes such as 16 QAM, 64 QAM or 256 QAM are utilized, while for those experiencing low quality, modulation schemes such as BPSK or QPSK are utilized. The selected modulation and coding may only predominantly match the current received signal quality for reasons such as channel quality measurement delay or errors, channel quality reporting delay or errors, efforts to measure or predict current and future interference, and efforts to measure or predict the future channel.

Multiple coding rates may be available for each modulation scheme to provide finer AMC granularity, to enable a closer match between the quality and the transmitted signal characteristics (e.g., R=¼, ½, and ¾ for QPSK; R=½ and R=⅔ for 16 QAM, etc.). Note that AMC can be performed in the time dimension (e.g., updating the modulation/coding every Nt OFDM symbol periods) or in the frequency dimension (e.g., updating the modulation/coding every Nsc subcarriers) or a combination of both.

Figure 5:
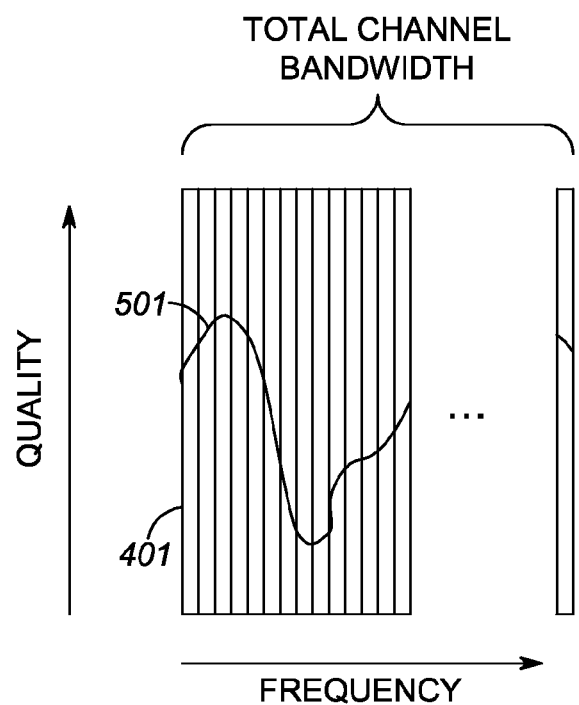

FIG. 5 illustrates how the quality of the signal can change based on frequency. More particularly, FIG. 5 shows how quality 501 of a signal may vary over frequency, or the channel bandwidth. As is evident, quality 501 is relatively high for the first four subcarriers, and relatively low for 7th through 9th subcarriers. With this type of information available to a UE based on scanning within the wideband channel, the UE can either determine the preferred sub-channels for sub-band transmission, or may simply provide sub-channel quality information for one or more sub-channels to its base station.

If quality information can be measured and reported on a frame-by-frame basis, then AMC can be performed on a frame-by-frame basis as well, with the particular modulation/coding utilized being based on the channel quality of the particular sub-channel. More particularly, base station 310 will determine the modulation/coding scheme utilized for a particular sub-channel based on its particular channel quality. In general, the channel quality information is valid only for a time on the order of the channel coherence time so that the determination of the modulation/coding scheme needs to be performed with a fine time granularity. The coherence time of the channel is related to the UE speed; channel quality information gets more outdated the faster the UE is moving, or the faster the environment surrounding the UE changes. Hence, the time granularity can be defined as a function of the UE speed. If quality information is available for multiple subcarriers within the sub-channel, then AMC can optionally be applied in the frequency dimension as well (e.g., over the subcarriers within the sub-channel). AMC can also be applied across different UEs co-scheduled at the same time, e.g. with OFDMA schemes.

The LTE standard defines a resource block (RB) as the minimum resource allocation unit. An RB is comprised of a predefined number of OFDM symbols and subcarriers. LTE also defines channel quality reporting through the use of a channel quality indicator (CQI) that is reported back to the base station by the UE. CQI reporting may be wide-band, in which case a single value reflects the channel quality across the entire receive band, or sub-band, in which case multiple CQI values, assigned to groups of RBs, are reported to reflect the channel quality of each sub-band. Typically, the CQI comprises a field within a message that indicates the AMC directed to be utilized by a base station. For example, a mobile station may utilize one of 28 possible combinations for modulation and coding. When a channel quality is determined, an appropriate modulation and coding scheme (MCS) may be fed back to the base station. Thus, for example, a mobile station may be utilizing modulation and coding scheme "14". Interference may increase, causing the mobile station to request modulation and coding scheme "5" via a CQI.

As discussed above, even with error-correction techniques, it may often be impossible to adequately mitigate interference between geographically co-located and spectrally distinct wireless transceivers. For example, a measurement of channel quality at one point in time, and its corresponding CQI value, may not adequately reflect intermittent interference caused by simultaneous transmissions from at least one nearby wireless transceiver at another point in time. For example, at one particular instance in time, radio 314 may not be transmitting. Because of this, radio 312 may measure a very high-quality channel between it and base station 310. Feeding back a corresponding CQI may result in an AMC being chosen that will not accommodate data transmissions when radio 314 begins its transmissions.

In order to address this issue, radio 312 will determine the impacted frequencies in the receive spectrum and degree of impact based on the potential transmission of radio 314. (As defined, potential, means possible, as opposed to actual). The transmission characteristics include timing, frequency, bandwidth, transmission power, and coupled power to the LTE receiver. Radio 312 may be made aware of radio 314's transmission characteristics through a communication link between the devices. This link can be achieved via, for example, a "wired" connection, for example between modems in the same multi-mode device, or via out-of-band communications between the modems in nearby devices, as described for example in U.S. Pat. No. 7,860,521 B2. Radio 312 may also determine the characteristics of the interfering transmissions through RF measurements of the transmissions from radio 314.

Once a potential interferer is determined, and the impact of IMD on the receive band is predicted, a CQI may be biased accordingly. For example, even though radio 312 may be experiencing channel quality that supports a first modulation and coding scheme, a CQI may be fed back to base station 310 that causes base station 310 to utilize a second modulation and coding scheme that supports a more robust transmission. In an alternate embodiment, a potential interferer is determined and the impact of the IMD to each sub-band across the receive band is predicted. In this embodiment, each sub-band CQI value may be biased accordingly.

Figure 6:
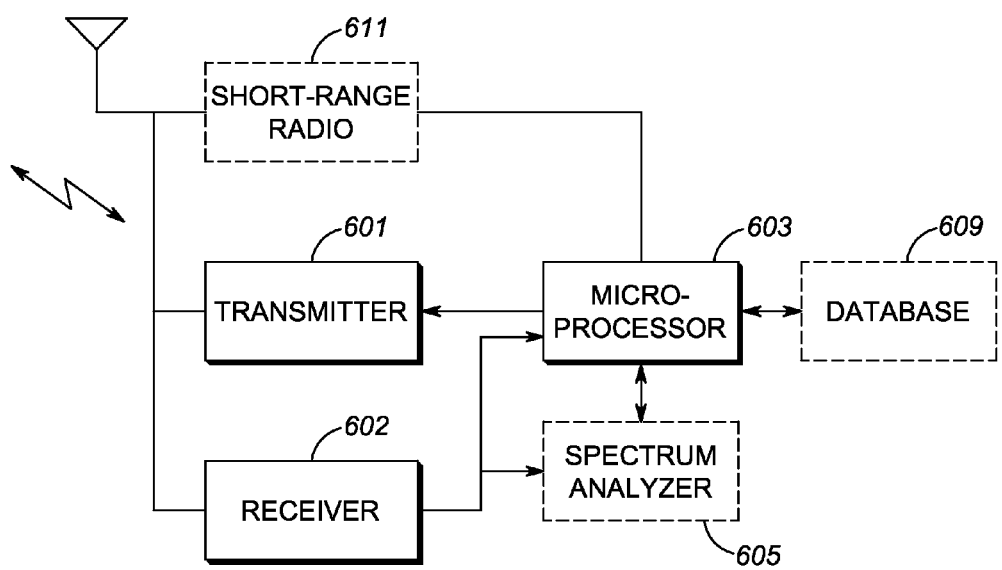
FIG. 6 is a block diagram of a radio.

FIG. 6 is block diagram of radio 312. As shown, radio 312 comprises logic circuitry 603 (microprocessor 603), receive circuitry 602, and transmit circuitry 601. Logic circuitry 603 preferably comprises a digital signal processor (DSP), general purpose microprocessor, a programmable logic device, or application specific integrated circuit (ASIC). In the preferred embodiment of the present invention logic circuitry 603 serves as means for controlling radio 312, and as means for determining potential interferers and adjusting a CQI accordingly.

Receive and transmit circuitry are common circuitry known in the art for communication utilizing a well known communication protocol, and serve as means for transmitting and receiving messages. Optional spectrum analyzer 605 is provided for scanning channels for potential interference. Those skilled in the art will recognize that spectrum analyzer 605 could be implemented by various mechanisms including digitizing the output of broadband RF detection diodes with band specific filtering for specific interferers. Database 609 comprises standard random-access memory, and is utilized to store information related to potential interferers. Finally, optional short-range radio 611 comprises circuitry such as a Bluetooth™ radio capable of short-range communications.

Determining Potential Interferers:

In one embodiment, when radio 314 is initiating transmissions, radio 314 sends an alert signal to its co-located radio 312. The alert signal is received on short-range radio 611 and may comprise an alert containing power as well as time and channel scheduling information. This may be sent via any mechanism, but preferably is sent via a short-range communication link such as a Bluetooth™ communication link. The alert may indicate a power level and/or channels being utilized for the call as well as scheduling information regarding future planned use of the channels.

In an alternate embodiment, radios 312 and 314 do not communicate with each other. Rather, radio 312 utilizes spectrum analyzer 605 to periodically scan adjacent channels to determine a use pattern for radio 314. The use pattern may be stored in database 609. Potential interferers can then be inferred based upon the use pattern.

Regardless of how potential interferers are inferred, a CQI value is modified based on potential interferers. In other words, unlike prior art systems where the CQI value is modified solely upon existing signal quality, the CQI in the present invention is modified additionally based on potential interference from a co-located radio. Thus, for example, if a current transmit/receive channel supports a first MCS indicated by a first CQI value, and if there is a potential for interference on the current transmit/receive channel, then a lower requested MCS, indicated by a second CQI value may be fed back to the base station. This process is shown in FIG. 7.

Figure 7:
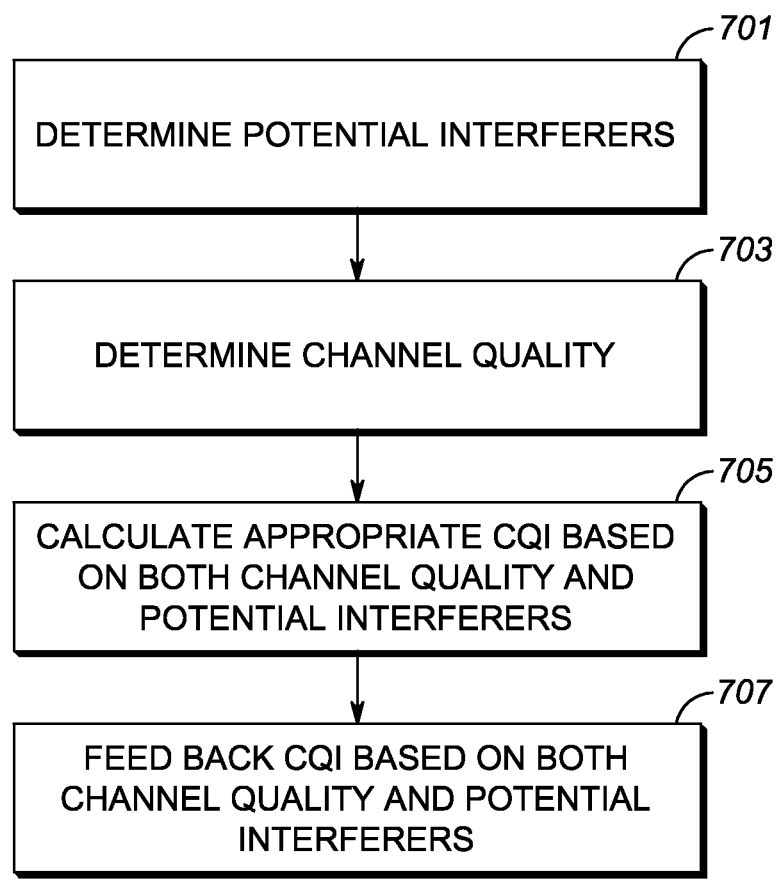
FIG. 7 is a flow chart showing operation of the radio of FIG. 6.

FIG. 7 is a flow chart showing the operation of radio 312 mitigating potential, as opposed to actual interference between geographically co-located and spectrally distinct wireless transceivers. At a later time the interference may become actual interference. More particularly, the logic flow of FIG. 7 shows those steps taken by radio 312 when feeding back a CQI value to infrastructure equipment. The logic flow begins at step 701 where potential interferers are determined by logic circuitry 603. The potential interferers comprise co-located and spectrally distinct wireless radios. As discussed above, this may be determined by accessing database 609 to determine a use pattern for any potential interferer, and infer that potential interference is likely.

Alternatively, this may be accomplished by logic circuitry 603 receiving a signal (alert) directly from the interferer via short-range radio 611. The alert provides specific information about a potential interferer which may include type of interferer (narrowband/wideband), frequency band of interferer and transmit power of interferer. Spectrum analyzer 605 measures the alert's receive power level and sends this information to microprocessor 603. Given the alert transmit and receive power and the alert frequency, logic circuit 603 estimates distance between devices 312 and 314. Logic circuit 603 uses distance between devices 312 and 314 along with transmit power and frequency of device 314 to estimate the receive power level of potential external interferers at receiver 602. Logic circuit 603 further determines the impact of potential IMD interference to receiver 602 based on the leakage of transmitter 601 into receiver 602, the power level of the potential interference from UE 314 and the IMD susceptibility (i.e. third and fifth order input intercept points) of receiver 602.

At step 703 a channel quality is determined by logic circuitry 603 for particular channels capable of supporting a first modulation and coding scheme. As discussed, the channel quality may comprise a single value for the wideband channel, or may alternatively comprise multiple values for various resource blocks or sub channels of the wideband channel. The channel quality may simply comprise an MCS that the channel is capable of supporting. Thus, for example, the channel may be capable of supporting a first modulation and coding scheme "14".

At step 705 logic circuitry 603 determines/calculates an appropriate CQI based on both the channel quality and any potential interferers. Thus, for example, supporting a first modulation and coding scheme "14". However, even though interference is not yet occurring, there may be a potential for interference, causing the mobile station to request a second modulation and coding scheme of "5" via a CQI feedback. It should be noted that 3GPP supports an indication of "preferred" sub-channels via certain modes of the CQI feedback procedure. In some cases, when the IMD is bad enough, certain sub-channels may become unusable even at the lowest CQI, so it would be beneficial for the UE to fail to provide a CQI for those sub-channels, even though a particular MCS may currently be supported by those sub-channels. This would potentially result in only providing CQI for sub-bands which have no potential for interference. For example, Mode 2-0 description of 3GPPP states the radio shall select a set of M preferred subbands of size k (where k and M are given in Table 7.2.1-5 for each system bandwidth range) within the set of subbands S. The radio shall also report one CQI value reflecting transmission only over the M selected subbands determined in the previous step. With this in mind, a variation on this approach may take place by having the subbands reported back be those with no potential for interference. This results in the step of feeding back the CQI to infrastructure equipment comprising the step of selecting a set of sub-bands which have no potential for interference and providing CQI feedback for just those bands.

Finally, at step 707 the appropriate CQI is fed back to infrastructure equipment via transmitter 601 causing the infrastructure equipment to utilize the second modulation and coding scheme as part of OFDM communications.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for mitigating interference between geographically co-located and spectrally distinct wireless transceivers (radios), the method comprising the steps of:
   at a first radio, determining potential interference for the co-located and spectrally distinct wireless radio;
   determining a current channel quality for particular channels, wherein the particular channels are capable of supporting a first modulation and coding scheme;
   calculating an appropriate channel quality indicator (CQI) based on the potential interferer and the current channel quality; and
   feeding back the CQI to infrastructure equipment, causing the infrastructure equipment to utilize a second modulation and coding scheme.

2. The method of claim 1 wherein the current channel quality comprises a single value for a wideband channel.

3. The method of claim 1 wherein the current channel quality comprises a plurality of values, each for a portion of the wideband channel.

4. The method of claim 1 wherein the infrastructure utilizes the second modulation and coding scheme as part of an OFDM communication.

5. The method of claim 1 wherein the step of determining potential interference comprises the step of receiving an alert from the co-located and spectrally distinct wireless radio.

6. The method of claim 1 wherein the step of determining potential interference comprises the step of using a spectrum analyzer to determine a pattern of use for the co-located and spectrally distinct wireless radio.

7. The method of claim 1 wherein the step of feeding back the CQI to infrastructure equipment comprises the steps of selecting a set of sub-bands which have no potential for interference and providing feedback to infrastructure equipment indicating the selected sub-bands and CQI for those sub-bands.

8. The method of claim 1 wherein the potential interference comprises possible, as opposed to actual interference.

9. A method for mitigating potential as opposed to actual interference between geographically co-located and spectrally distinct wireless transceiver (radio), the method comprising the steps of:
- receiving an alert from the co-located and spectrally distinct wireless radio via a short-range wireless communication;
- based on the alert, determining potential as opposed to actual interference caused by the co-located and spectrally distinct wireless radio;
- determining a current channel quality for particular channels, wherein the particular channels are capable of supporting a first modulation and coding scheme;
- calculating an appropriate channel quality indicator (CQI) based on the potential interferer and the current channel quality; and
- feeding back the CQI to infrastructure equipment, causing the infrastructure equipment to utilize a second modulation and coding scheme.

10. The method of claim 9 wherein the current channel quality comprises a single value for a wideband channel.

11. The method of claim 9 wherein the current channel quality comprises a plurality of values, each for a portion of the wideband channel.

12. The method of claim 9 wherein the infrastructure utilizes the second modulation and coding scheme as part of an OFDM communication.

13. The method of claim 9 wherein the step of feeding back the CQI to infrastructure equipment comprises the steps of selecting a set of sub-bands which have no potential for interference and providing feedback to infrastructure equipment indicating the selected sub-bands and CQI for those sub-bands.

14. An apparatus comprising:
- logic circuitry determining potential interference for the co-located and spectrally distinct wireless radio, determining a current channel quality for particular channels, wherein the particular channels are capable of supporting a first modulation and coding scheme, calculating an appropriate channel quality indicator (CQI) based on the potential interferer and the current channel quality; and
- a transmitter feeding back the CQI to infrastructure equipment, causing the infrastructure equipment to utilize a second modulation and coding scheme.

15. The apparatus of claim 14 wherein the current channel quality comprises a single value for a wideband channel.

16. The apparatus of claim 14 wherein the current channel quality comprises a plurality of values, each for a portion of the wideband channel.

17. The apparatus of claim 14 wherein the infrastructure utilizes the second modulation and coding scheme as part of an OFDM communication.

18. The apparatus of claim 14 further comprises:
- a receiver, receiving an alert from the co-located and spectrally distinct wireless radio; and
- wherein the logic circuitry determines potential interference from the alert.

19. The apparatus of claim 14 further comprising:
- a spectrum analyzer; and
- wherein the logic circuitry determines potential using the spectrum analyzer to determine a pattern of use for the co-located and spectrally distinct wireless radio.

20. The apparatus of claim 14 wherein the potential interference comprises possible, as opposed to actual interference.

* * * * *